Aug. 8, 1944.   P. SCHOONENBERG ET AL   2,355,398
OSCILLATION RECORD
Filed July 12, 1939
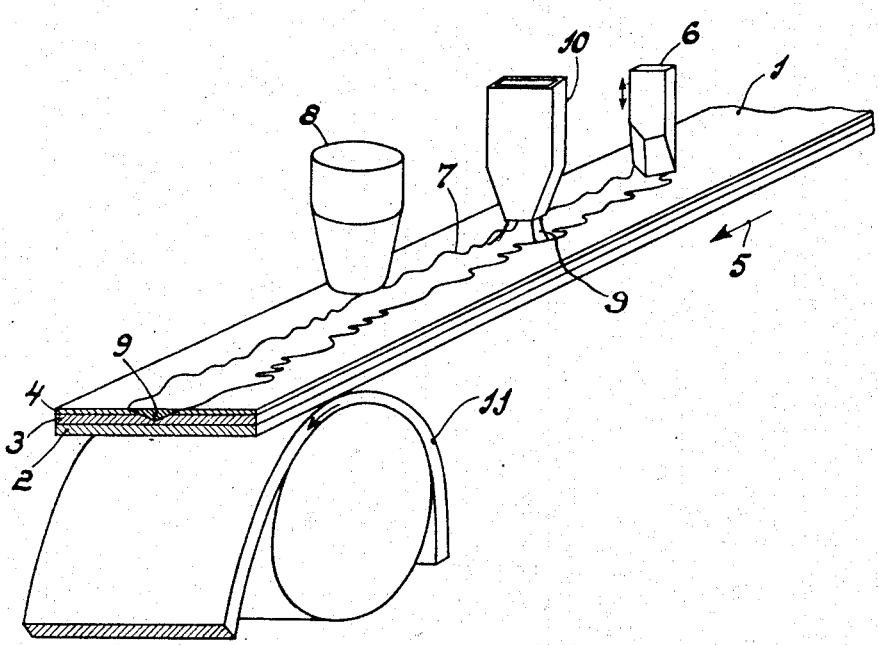
INVENTORS
P. Schooenberg,
J. J. Hardenberg and
C. J. Dippel
By
R. F. Wendroth
ATTORNEY Patented Aug. 8, 1944

2,355,398

UNITED STATES PATENT OFFICE 2,355,398

OSCILLATION RECORD

Pancras Schoonenberg, Jan Jesayas Hardenberg, and Cornelis Johannes Dippel, Eindhoven, Netherlands, assignors, by mesne assignments, to Hartford National Bank and Trust Company, Hartford, Conn., as trustee Application July 12, 1939, Serial No. 284,124
In Germany June 15, 1936

4 Claims. (Cl. 106—37)

The present invention which is a continuation-in-part of our copending U. S. patent application S. N. 148,396, filed June 15, 1937, relates to hill-and-dale oscillation tracks formed in a band-shaped layer of transparent material such as gelatin and the like, and particularly to a material for filling such tracks.

As our invention is particularly useful in connection with oscillation tracks which have been mechanically recorded by the method described in the U. S. Patent 1,919,116 to James A. Miller, we shall describe the same in this connection. However, our invention is not limited thereto, but may be used with other types of hill-and-dale tracks.

In optically copying hill-and-dale tracks it has been proposed to eliminate the difficulties due to the light interference phenomenon resulting from the recesses produced or present in the carrier material by filling the recesses with a substance having an index of refraction substantially equal to that of the carrier material. For example, an oscillation track in relief produced in a thin foil by deforming the foil without the removal of material has been filled with a substance having a suitable index of refraction, and after this substance has been allowed to harden to a sufficient extent, the track is reproduced by a photo-electric means. In this method, variations in height of the deformed foil portions form small lenses whose action was used in scanning.

Furthermore, in the case of gelatine films provided with photographic sound track, it has been proposed to overcome the difficulties due to surface irregularities by superimposing upon the surface of the film a thin layer having a smooth surface. This was effected, for example by painting the surface of the film with a substance having an index of refraction substantially equal to that of the gelatine layer. However, in this case, it was necessary to allow the substance to harden to a sufficient degree before the film could be reproduced or optically copied, and this required considerable time.

The object of our invention is to provide a filling material which allows the hill-and-dale record to be optically copied shortly after the track is filled with the material.

In accordance with the invention, we use as the filling material a rapidly-hardening liquid having the same index of refraction as the material in which the track is formed. More particularly, if the track is produced in a gelatin layer, we fill the track with a suitable highly-concentrated gelatinous liquid having an index of refraction substantially identical with that of the gelatin layer. Preferably, we use a filling substance which hardens quickly and in some cases hardens during or even before the copying is effected.

To expedite the hardening of the filling material, we add thereto substances such as sulphonated oil, which are soluble in water, and in some cases add substances, such as glycerine or sugar, to prevent shrinkage of the filling material due to dessication. Obviously the filling materials should be such that they do not attack the carrier material with which they come in contact.

In order that the invention may be clearly understood and readily carried into effect, we shall describe same in more detail with reference to the accompanying drawing, in which the single figure illustrates the contact copying of a mechanically-recorded sound track which is filled with a filling material according to the present invention.

Referring to the drawing, a carrier 1 comprising a transparent supporting layer 2 of Celluloid, a transparent recording layer 3 of gelatin, and a thin covering layer 4 of an opaque material, is moved in the direction of arrow 5 at a constant speed. A cutting tool 6 having a V-shaped cutting edge of a large apical angle is vibrated in the direction of the double-headed arrow in accordance with the sound being recorded, to thereby cut in carrier 1 a sound track 7 having width variations which are a proportional enlargement of the depth variations. In such recording, which has been described in detail in the above-mentioned patent, the sound track 7 can be immediately reproduced or optically copied.

The carrier 1 is then passed between a suitable copying light source 8 and a band-shaped carrier 11 provided with a photographic layer and moving in the direction of the arrows whereby sound track 7 is copied by contact copying in the manner well known in the art.

In accordance with the invention we fill the sound track 7 immediately before it is copied and for this purpose we employ a filling material having an index of reflection substantially the same as the gelatin of the cutting layer. For this purpose we apply the material to the track by a suitable applying device 10 disposed immediately before the copying point. The filling material 9 may have one of the following compositions.

I

|  | Parts |
|---|---|
| Gelatin | 10 |
| Water | 15 | without any further substance.

II

|  | |
|---|---|
| Gelatin | 10 |
| Water | 15 |
| Glycerin | 50 to 100 |

III

|  | |
|---|---|
| Gelatin | 10 |
| Water | 25 |
| Glycerin | 25 |
| Sulfonated oil, for instance the oil known as Turkish red oil or Turkon oil | 10 to 25 |

IV

|  | |
|---|---|
| Gelatin | 10 |
| Water | 25 |
| Glycerin | 25 |
| Sugar | 10 |
| Turkon oil | 10 |

Instead of glycerin we can use a product named "Sorbitol" (an alcohol derived from the sugar sorbiet) for example.

V

|  | |
|---|---|
| Gelatin | 10 |
| Water | 15 |
| Sorbitol | 50 |

Each of those products are suitable to fill up the track as they can be applied to the carrier as a liquid and they harden rapidly, even before the carrier reaches the copying point.

From the above it appears that, when using filling materials according to the invention, the carrier does not have to be dried and the filling substance does not have to be hardened before copying, but the record may be copied immediately after the filling substance is applied; i. e., the filling of the track and the copying operation may be effected substantially simultaneously. Furthermore, after completion of the copying process the record is in condition for subsequent repeated copying or reproducing because the hardened filling substance constitutes a unitary connection with the gelatin layer 3.

By selecting a suitable filling substance, we also obtain a permanently smooth surface on the track portion of the carrier whereby the powerful lens action of the variations in depth is not present during repeated copying. In addition, there is no danger of dust accumulating in the track, and the carrier, which has a smooth surface, can be readily cleaned without danger of injuring the surface of the track. To further protect the carrier during cleaning, we may apply an additional layer of a suitable protective material over at least part of the surface of the carrier. The use, for this purpose, of a non-rapidly-hardening liquid having the same index of refraction as the cutting layer of the carrier does not present the above-mentioned advantages.

While we have described our invention in connection with specific examples and applications, we do not wish to be limited thereto, because obvious modifications will readily present themselves to one skilled in the art.

What we claim is:

1. As a filling material for a sound track of the hill and dale type, a highly-concentrated gelatinous semi-liquid material containing a water-soluble sulphonated oil.

2. As a filling material for a sound track of the hill-and-dale type, a highly concentrated gelatinous semi-liquid material containing glycerin and a water-soluble sulfonated oil.

3. As a filling material for a sound track of the hill-and-dale type, a highly concentrated gelatinuous semi-liquid material consisting substantially of approximately 10 parts of gelatin, approximately 25 parts of water, approximately 25 parts of glycerin and about 10 to about 25 parts of a water-soluble sulfonated oil.

4. As filling material for a sound track of the hill-and-dale type, a highly concentrated gelatinous semi-liquid material consisting substantially of approximately 10 parts of gelatin, approximately 25 parts of water, approximately 25 parts of glycerin, approximately 10 parts of sugar and approximately 10 parts of a water-soluble sulfonated oil.

PANCRAS SCHOONENBERG.
JAN JESAYAS HARDENBERG.
CORNELIS JOHANNES DIPPEL.